United States Patent [19]
Carlson

[11] Patent Number: 4,875,630
[45] Date of Patent: Oct. 24, 1989

[54] LEAF VACUUM AND SHREDDER

[76] Inventor: William P. Carlson, P.O. Box 2325, Kailua-Kona, Hi. 96745

[21] Appl. No.: 255,325

[22] Filed: Oct. 11, 1988

[51] Int. Cl.[4] ............................................. B02C 13/28
[52] U.S. Cl. .................................. 241/56; 241/188 R; 241/193; 241/292.1
[58] Field of Search ............... 241/292.1, 282.1, 282.2, 241/101.7, 56, 189 R, 188 R, 195, 193, 194, 101.1

[56] References Cited
U.S. PATENT DOCUMENTS

| | | | |
|---|---|---|---|
| 3,392,923 | 7/1968 | Reinecker et al. | 241/56 |
| 4,214,713 | 7/1980 | Wright | 241/101.7 X |

FOREIGN PATENT DOCUMENTS 482 of 1854 United Kingdom ................ 241/193

Primary Examiner—Mark Rosenbaum
Attorney, Agent, or Firm—Douglas E. White

[57] ABSTRACT

A comminuting apparatus uses a vacuum hose to draw fibrous vegetable matter, such as leaves, twigs or the like, into a shredder for disintegration. A flexible hose leads to a shredding chamber surrounding a rotating shaft to which whips are loosely attached. The whips are preferably made of stiff metal wire, but chains, knives or rods could be substituted therefor. The shaft is journalled within a bearing supported by radial struts attached to the inner wall of the cylindrical shredding chamber housing. A single fixed whip may be attached to the shaft outward from the struts for clearing leaves from the struts. The remainder of the whips are on the portion of the shaft inward of the bearing and struts.

8 Claims, 3 Drawing Sheets

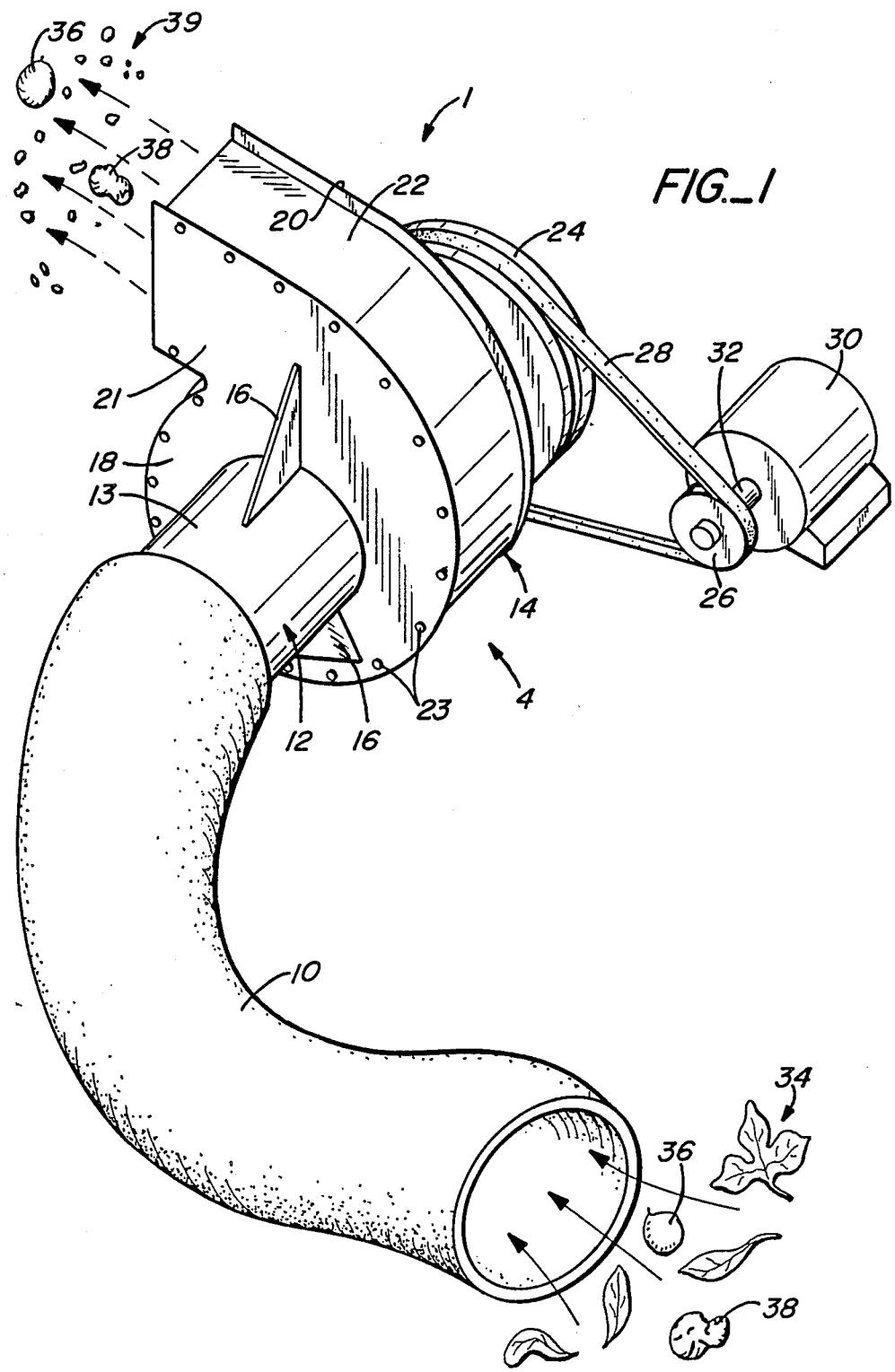
FIG._1

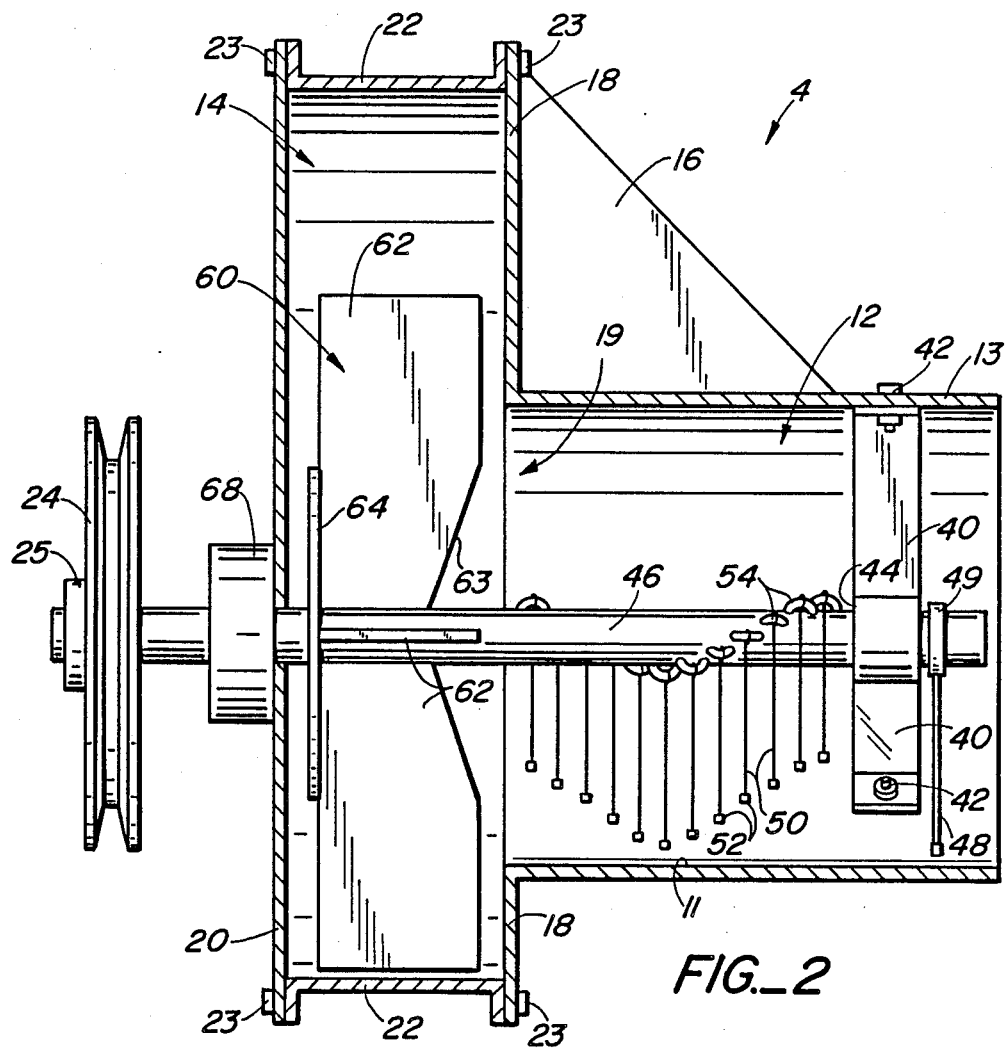
FIG._2

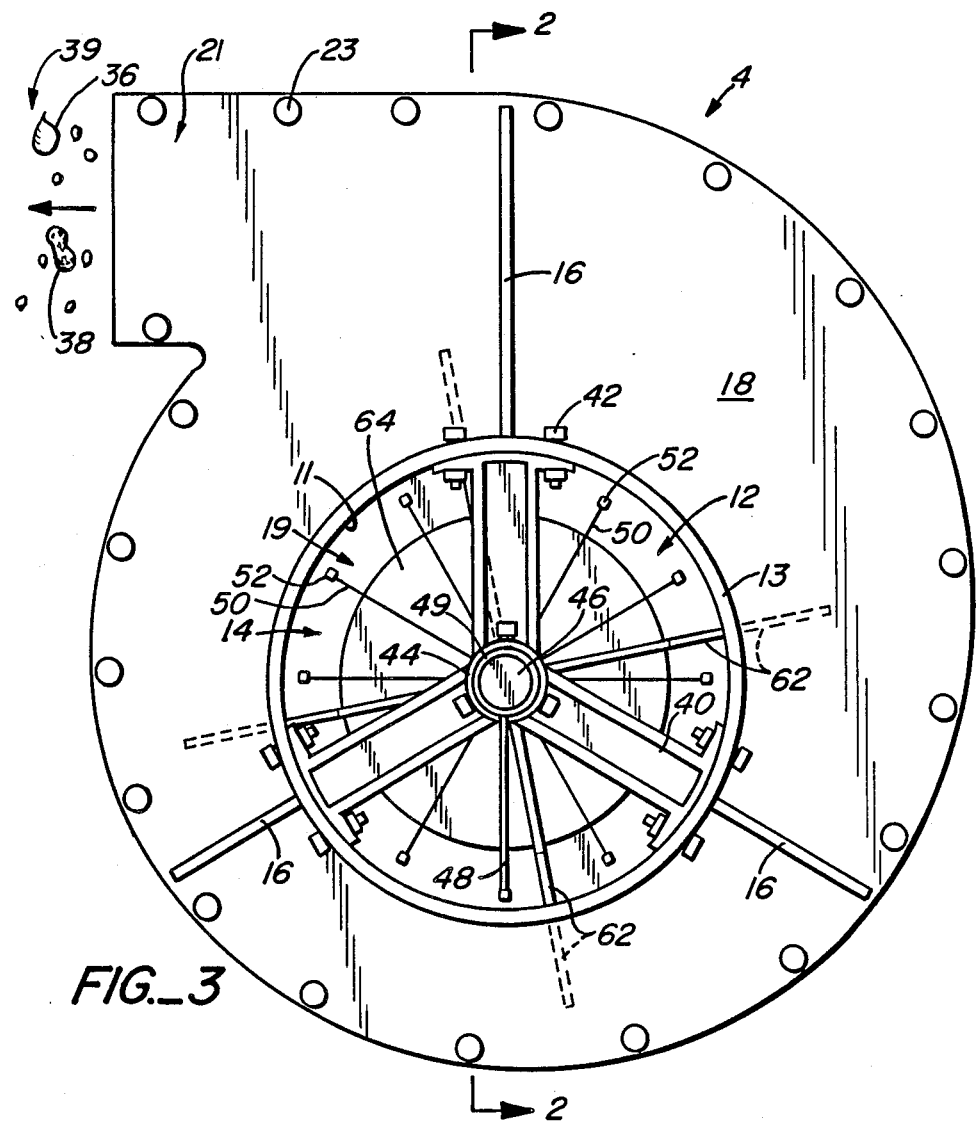
FIG._3

LEAF VACUUM AND SHREDDER

FIELD OF THE INVENTION

This invention relates to apparatus for comminuting ground strewn vegetable matter, more particularly to a vacuum and shredder apparatus which gathers and mulches leaves and the like.

BACKGROUND OF THE INVENTION

The disposition of leaves, small twigs, grasses and the like is a significant problem, particularly when considered in connection with the commercial harvesting of nut crops where valuable crop material may lie on the ground mixed in with the unwanted vegetable matter. It is desired to pick up the debris and crop together and to pulverize, comminute or shred only the debris, which debris then may be separated from the crop and easily transported, in view of the resulting decrease in its bulk.

Prior developments in this field will be generally illustrated by reference to the following patents:

| Patent No. | Patentee | Issue Date |
|---|---|---|
| 3,049,857 | Shaw | 08/21/62 |
| 3,712,353 | Ferry | 01/23/73 |
| Re.29,139 | Messner | 02/22/77 |
| 3,940,827 | Greco | 03/02/76 |
| 2,809,389 | Collins et al. | 10/15/57 |
| 4,043,100 | Aumann et al. | 08/23/77 |
| 2,658,318 | Miller | 11/10/53 |
| 2,538,643 | Gregory | 01/16/51 |
| 3,184,777 | Norden | 05/25/65 |

The patent to E. S. Ferry, U.S. Pat. No. 3,712,353 shows a suction chute (rather than a hose) leading to a chamber in which a single blade spins on a rotating shaft. A fan behind the blade sucks leaves past the blade and discharges the shreddings. J. D. Shaw, U.S. Pat. No. 3,049,857 teaches a similar machine except that the fan precedes the single blade.

U.S. Pat. Nos. Re. 29,139 and 3,940,827 teach vacuums attached to lawn mowers for disintegrating leaves and the like.

U.S. Pat. Nos. 2,809,389, 4,043,100, 2,658,318 and 2,538,643 show vacuum shredders of various configurations.

The rest of the patents are representative of what is in the art.

A disadvantage of prior devices is that they utilize blades which are rigidly fixed to spinning shafts. Such blades are easily dulled or broken by rocks or other foreign objects. Furthermore, they are difficult to repair and expensive to replace.

SUMMARY OF THE INVENTION

Manual and vacuum feed leaf shredders are known. The present invention is an apparatus which uses a vacuum hose to draw fibrous vegetable matter, such as leaves, twigs or the like, into a shredder for disintegration. This eliminates the need to manually retrieve and transport leaves to a shredder hopper or the like.

A flexible hose leads to a shredding chamber surrounding a rotating shaft to which whips are loosely attached. The whips are preferably made of stiff metal wire, but chains, knives or rods could be substituted therefor. The shaft is journalled within a bearing supported by radial struts attached to the inner wall of the cylindrical shredding chamber housing. A single fixed whip may be attached to the shaft outward from the struts for clearing leaves from the struts. The remainder of the whips are on the portion of the shaft inward of the bearing and struts.

The shredding chamber leads to a vacuum chamber containing a fan which rotates on the same shaft as the whips. A discharge chute leads out of the vacuum chamber. An external motor drives the fan and whips via the shaft. The fan creates a vacuum which sucks leaves into the hose. The leaves are shredded by the whips and the mulch is drawn into the vacuum chamber where it is ejected through the discharge chute.

The apparatus may be mounted on a trailer. Alternatively, the hose could, for example, be connected to the discharge chute of a lawn mower and the discharge chute of the shredder itself could direct its output to a collecting bin or hopper. Apparatus for separating a nut crop from leaves could be affixed to the discharge chute.

FEATURES AND ADVANTAGES

A principal object of this invention is to eliminate damage caused to the shredder by small rocks and other hard objects which may, in prior art devices, enter the shredder and, through forceful contact with rigid shredder elements, dull or break them. Accordingly, the shredding whips are loosely attached to mounting pivots in the present invention. When hit by rocks or the like, the whips simply rotate on their pivots and do not sustain significant damage.

Another important object of this invention is to reduce the injury which may, in prior art devices, be caused to valuable shell crops, such as nuts, which are mixed with the leaves and vegetable matter on the ground. Like rocks, these are sucked up into the shredding chamber, but do not suffer significant damage in the present machine because, as noted above, the loose whips give rather than impact with force.

A further object is to reduce the down time caused by repair of shredding members and the cost thereof. Accordingly, the whips of the present mechanism may be easily and cheaply replaced on their pivot mounts, eliminating the need to dismantle complex assemblies and/or sharpen blades.

Yet another object is to disclose a plurality of shredding whips so that complete shredding is accomplished even though any one whip is not able to exert strong force against the leaves.

A further object is to disclose one whip which is fixed with respect to the turning shaft, which whip exerts enough force to clean bearing struts, yet which does not present enough cross-sectional area to contact rocks or nuts on a frequent basis.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is perspective view of a preferred leaf vacuum and shredder of my invention;

FIG. 2 is an sectional elevational view of the shredder of FIG. 1, taken substantially on the plane of line 2—2 of FIG. 3, showing disposition of the loose whips when the shredder is at rest; and FIG. 3 is a side elevation of the shredder assembly of the device of FIG. 1 showing disposition of the loose whips when the device is in operation.

| Drawing Reference Numerals | |
| --- | --- |
| 1 | leaf vacuum and shredder |
| 4 | shredder assembly |
| 10 | hose |
| 11 | inner wall of 13 |
| 12 | shredding chamber |
| 13 | cylindrical housing of 12 |
| 14 | vacuum chamber |
| 16 | gussets |
| 18 | front plate of 14 |
| 19 | opening in 18 |
| 20 | back plate of 14 |
| 21 | discharge chute |
| 22 | channel wall of 14 |
| 23 | bolts for 22 |
| 24 | follower sheave |
| 25 | collar for 24 |
| 26 | drive sheave |
| 28 | belt |
| 30 | motor |
| 32 | armature shaft of 30 |
| 34 | vegetable matter |
| 36 | nuts |
| 38 | rocks |
| 39 | mulch |
| 40 | struts |
| 42 | bolts for 40 |
| 44 | chamber bearing for 46 |
| 46 | shaft |
| 48 | fixed whip |
| 49 | collar for 48 |
| 50 | loose whips |
| 52 | weighted ends of 50 |
| 54 | mounting pivots for 50 |
| 60 | fan |
| 62 | vanes |
| 63 | notches |
| 64 | support plate for 62 |
| 68 | external bearing for 46 |

DESCRIPTION OF A PREFERRED EMBODIMENT

Referring to FIG. 1, there is illustrated therein a preferred leaf vacuum and shredder of my invention, generally indicated as 1. It is to be understood that my device 1 may be conveniently operated in any number of fashions for a wide variety of applications, not limited to leaf shredding, and therefore it may be mounted either on a suitable fixed platform or on a moveable carrier or perambulator. The wide variety of mounting apparatus available is not suitable for single illustration. However, for example, it has been found advantageous to mount the shredder 1 on a trailer for pulling behind a vehicle.

A hose 10 is schematically illustrated in FIG. 1 sucking up vegetable matter 34. In practice the hose 10 may advantageously terminate with an elongate suction nozzle of the type ordinarily associated with household vacuum cleaners (not illustrated) or other suitable means for directing air movement.

The hose is operably sealed to a shredding chamber, generally designated as 12, by encircling the outer circumference of the cylindrical housing 13 of the chamber 12. Shredding chamber 12 communicates with a vacuum chamber, generally designated 14, in a manner discussed in more detail below. Vacuum chamber 14 comprises front plate 18, back plate 20, and channel wall 22. The plates and wall are secured together by any suitable means. It has been found advantageous, however, to employ removeable bolts 23 in order that easy access may be had to the interior of the chamber 14 for maintenance and cleaning. The plates 18,20 and wall 22 form a discharge chute or aperture 21. Gussets 16 strengthen the interconnection of housing 13 and front plate 18, which plate is disposed in a plane perpendicular to the axial center of the cylindrical housing 13.

The shredding chamber 12 and the vacuum chamber 14 together comprise a shredder assembly 4.

Motivation is provided by motor means 30 which is operably connected to means for transmitting rotary motion to the shredder 1. The motion transmitting means is herein illustrated as a follower sheave 24 about which is entrained a belt 28. The belt 28 is driven by a drive sheave 26 fixed to the armature shaft 32 of the motor 30. It is to be understood, however, that other suitable and equivalent drive means could be employed, such as sprockets and chain. It is to be further understood that, while an electric motor 30 has been drawn for purposes of illustration only, the motor for driving the belt may advantageously be of the internal combustion type.

Operation of the device, as discussed in more detail hereinbelow with reference to FIGS. 2 and 3, results in a forced air current entering the hose 10, sucking up from the ground with it fibrous vegetable matter or debris 34, such as leaves, twigs or grass. Depending on the nature of the particular use to which the shredder 1 is being used, small rocks or stones 38 and/or a valuable crop having a shell or thick outer skin, such as nuts or seeds 36, may also enter the hose 10.

After pulverization of the vegetable matter 34 within shredding chamber 12, the undesired debris exits the discharge chute 21 as mulch 39, while the rocks 38 and nuts 36 exit whole. The discharged material may be transported by suitable means for disposal or for further treatment, for example, for separation of the valuable crop material from the mulch. Additional hoses, a hopper or the like may be employed in this process, which devices are outside the scope of the present invention.

Referring now to the sectional elevation of FIG. 2, the interiors of the shredding 12 and vacuum 14 chambers can be seen therein. Traversing the axial center of the housing of the shredding chamber 12 is a rotatable shaft 46. Shaft 46 is journaled within an internal chamber bearing 44 and an external bearing 68 affixed to the back plate 20 of the vacuum chamber 14. This restrains the shaft 46 from movement other than smooth rotation about its axis. The shaft terminates on the exterior of the shredder assembly 4 in the follower sheave 24, which sheave is affixed thereto by collar 25.

The chamber bearing 44 is supported in the axial center of the housing 13 by struts 40 which radiate outwardly from the bearing to the inner wall 11 of the housing. Struts 40 may be welded or otherwise suitably attached to the housing 13, but it has been found advantageous to affix them by means of bolts 42 to assist in the maintenance of the bearing 44.

Outward of the struts 40 (with respect to the center of the device 1 as illustrated) there may be rigidly attached to the shaft 46 by means of a collar 49 a single fixed strut whip or thin blade 48. Collar 49 may be held in place, for example, with a simple set screw (not illustrated). Minimal clearance is provided between the fixed whip 48 and the struts 40 so that the whip 48 acts to clear the struts of accumulated debris.

Inward of the struts 40 the shaft 46 carries a plurality of cooperating loose whips or thin blades 50. Whips 50 are moveably attached to the shaft by means of a plurality of mounting pivots 54. The pivots 54 are disposed on the circumference of the shaft 46 in a helical or spiral configuration so that the whips 50, which have weighted ends 52, radiate in all directions outwardly from the shaft 46 when the device 1 is in operation, due to centrifugal force. This assures that all vegetable matter will be contacted by at least some of the whips as it passes through the shredding chamber 12.

The shaft 46 communicates with the vacuum chamber 14 via a circular opening 19 in the front plate 18, which opening is of the same diameter as the inner wall 11 of the shredding chamber housing 13. This provides smooth passage of the flow of air and vegetable matter through the chambers 12,14. Within the vacuum chamber, the shaft has a plurality of vanes 62 extending radially outwardly so as to form a suction fan 60. The vanes may have notch shaped portions 63 removed from their inner edges to further facilitate communication of shredded vegetable matter 39 from the shredding chamber 12 to the vacuum chamber 14. A circular support plate or backing 64 provides structural rigidity to the connection between the vanes 62 and the shaft 46.

The length of the whips 50 is such that there will be only a very slight clearance between their ends 52 and the interior surface of the housing 13. Similarly, only a slight clearance is provided between the tips of vanes 62 and the lower half of the wall 22 of the vacuum chamber 14 which is semi-circular in cross-section. In this manner, all material is shredded by the whips and all is forced out through the tangentially directed discharge chute 21.

Mode of Operation

When the machine 1 is at rest, i.e. the shaft 46 is not turning, the loose whips 50 all depend downwardly due to gravity and the lack of radial support from the pivots 54, as seen in FIG. 2. FIG. 3 shows the position of the loose whips 50 when the machine is in operation, i.e. when the shaft 46 is turning in a counterclockwise direction, as indicated by an arrow. At this time, the loose whips are directed radially outwardly by centrifugal force. A forceful current of air results from the partial or relative vacuum in the vacuum chamber 14 created by the fan 60. This sucks up vegetable matter 34 and perhaps small rocks 38 and valuable nuts 36, as well. These all pass into the shredding chamber where the lightweight and fragile vegetable matter is pulverized or shredded by contact with the loose whips 50. However, objects of greater density, such as rocks or hard skinned objects like nuts, merely deflect the loose whips on contact. Neither the whips nor the rocks or nuts are significantly damaged by such contact. It is true that contact with a fixed whip 48 can result in damage to a nut. However, that whip is thin and the likelihood of its contacting a particular nut is small. When one is struck the nut is deflected away from the fixed whip and is seldom pulverized. Where the nut crop is particularly fragile, the fixed whip 48 may be eliminated. In such a case, however, it may be necessary to substitute other strut cleaning means or to manually clean the struts at regular intervals.

In an alternate embodiment, it has been found effective to replace the fixed strut whip 48 with another loose whip in the same position without significant degradation in the strut whip's ability to clear the struts 40.

Once the vegetable debris 34 has been shredded it passes as mulch 39 into the vacuum chamber 14 and enters the spaces between the vanes 62 after travelling past the notches 63. The motion of the fan 60 then forces the mulch and the rocks and nuts out of the discharge chute 21 for further processing.

While the above provides a full and complete disclosure of the preferred embodiments of this invention, various modifications, alternate constructions, and equivalents may be employed without departing from the true spirit and scope of the invention. Therefore, the above description and illustrations should not be construed as limiting the scope of the invention which is defined by the appended claims.

I claim:
1. A comminuting apparatus including:
   a rotatable drive shaft having a circumference;
   means for driving the shaft;
   means for sucking air and matter to be comminuted past the shaft;
   a plurality of mounting pivots, the mounting pivots affixed to the circumference of the shaft on a line of helical configuration; and
   a plurality of loose stiff metal wire whips moveably affixed to the mounting pivots.
2. The apparatus of claim 1 wherein:
   the sucking means is a fan mounted on the shaft.
3. The apparatus of claim 2 further including:
   a shredding chamber; and
   a vacuum chamber connected to and communicating with the shredding chamber,
   the shaft traversing the chambers, the loose whips contained within the shredding chamber,
   the fan contained within the vacuum chamber.
4. The apparatus of claim 3 further including:
   a bearing for the shaft;
   at least one strut for supporting the bearing; and
   a strut whip affixed to the shaft outward of the bearing with respect to a geometric center of the apparatus, the loose whips affixed to the shaft inward of the bearing with respect to the geometric center.
5. The apparatus of claim 4 wherein:
   the means for driving the shaft is
   a sheave on the shaft;
   a belt on the sheave; and
   motor means for driving the belt and sheave.
6. The apparatus of claim 5 further including:
   a plurality of vanes forming the fan, the vanes forming notches facing the shredding chamber for facilitating the passage of air and matter to be comminuted from the shredding chamber into the vacuum chamber;
   hose means connected to the shredding chamber for directing air and matter therein; and
   a discharge chute for allowing air and matter to be expelled from the apparatus.

7. A leaf vacuum and shredder including:
a rotatable drive shaft having a circumference;
means for driving the shaft;
a fan mounted on the shaft for sucking air and matter to be comminuted past the shaft;
a plurality of mounting pivots, the mounting pivots affixed to the circumference of the shaft on a single line of helical configuration;
a plurality of loose stiff metal wire whips moveably affixed to the mounting pivots;
a bearing for the shaft;
at least one strut for supporting the bearing; and
a fixed whip rigidly affixed to the shaft outward of the bearing with respect to a geometric center of the apparatus, the loose whips affixed to the shaft inward of the bearing with respect to the geometric center.

8. The apparatus of claim 7 further including: weighted ends on the whips.

* * * * *